United States Patent [19]

Hashimoto

[11] 4,250,472
[45] Feb. 10, 1981

[54] UNDESIRED SIGNAL CANCELLER

[75] Inventor: Yoshitaka Hashimoto, Chofu, Japan

[73] Assignee: Sony Corporation, Tokyo, Japan

[21] Appl. No.: 962,705

[22] Filed: Nov. 21, 1978

[30] Foreign Application Priority Data

Dec. 2, 1977 [JP] Japan .................................. 52-145524

[51] Int. Cl.³ ........................ H03H 15/00; H03H 7/30
[52] U.S. Cl. .................................. 333/166; 333/17 R; 333/18; 333/19
[58] Field of Search ...................... 333/165, 17 R, 166, 333/167, 138–140, 174, 28 R, 18–20; 328/165, 167; 307/221 D; 364/819, 824, 825, 826; 358/187, 188, 167; 325/65, 475–476

[56] References Cited

U.S. PATENT DOCUMENTS

| 3,732,410 | 5/1973 | Mackechnie | 333/28 R X |
| 3,956,585 | 5/1976 | Butler et al. | 358/187 X |
| 4,127,874 | 11/1978 | Iwasawa et al. | 328/167 X |

Primary Examiner—Marvin L. Nussbaum
Attorney, Agent, or Firm—Hill, Van Santen, Steadman, Chiara & Simpson

[57] ABSTRACT

An apparatus for cancelling an undesired signal includes a programmable filter in which differential waveforms of a desired signal are superimposed on one another to form a composite signal similar to an undesired signal, a control circuit for detecting a level of the undesired signal to control the gain of a level adjusting circuit of the programmable filter so as to have a value proportional to the undesired signal, and a subtracter for subtracting the composite signal from an input signal.

8 Claims, 78 Drawing Figures

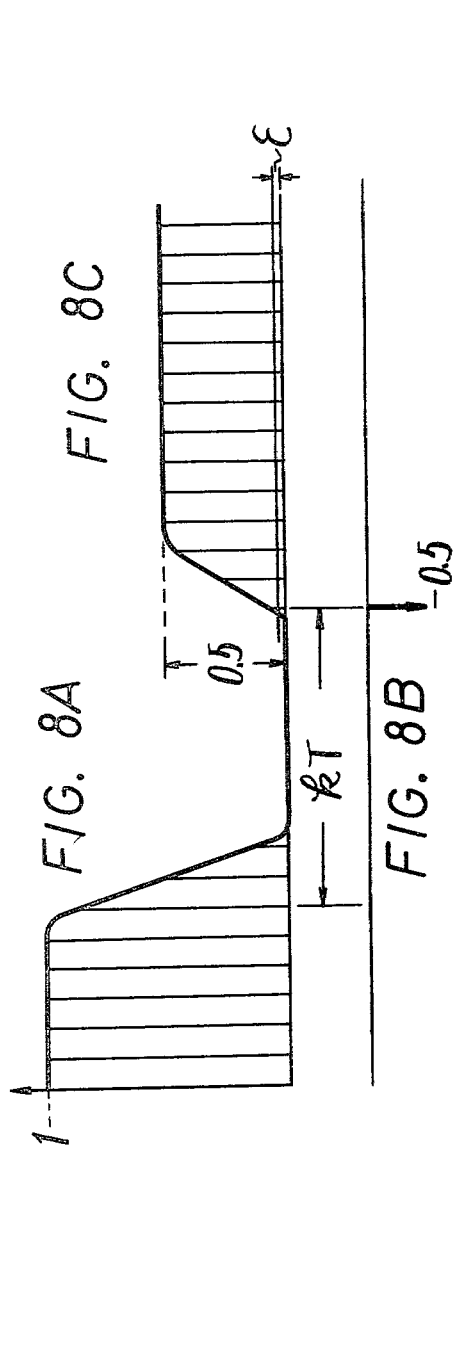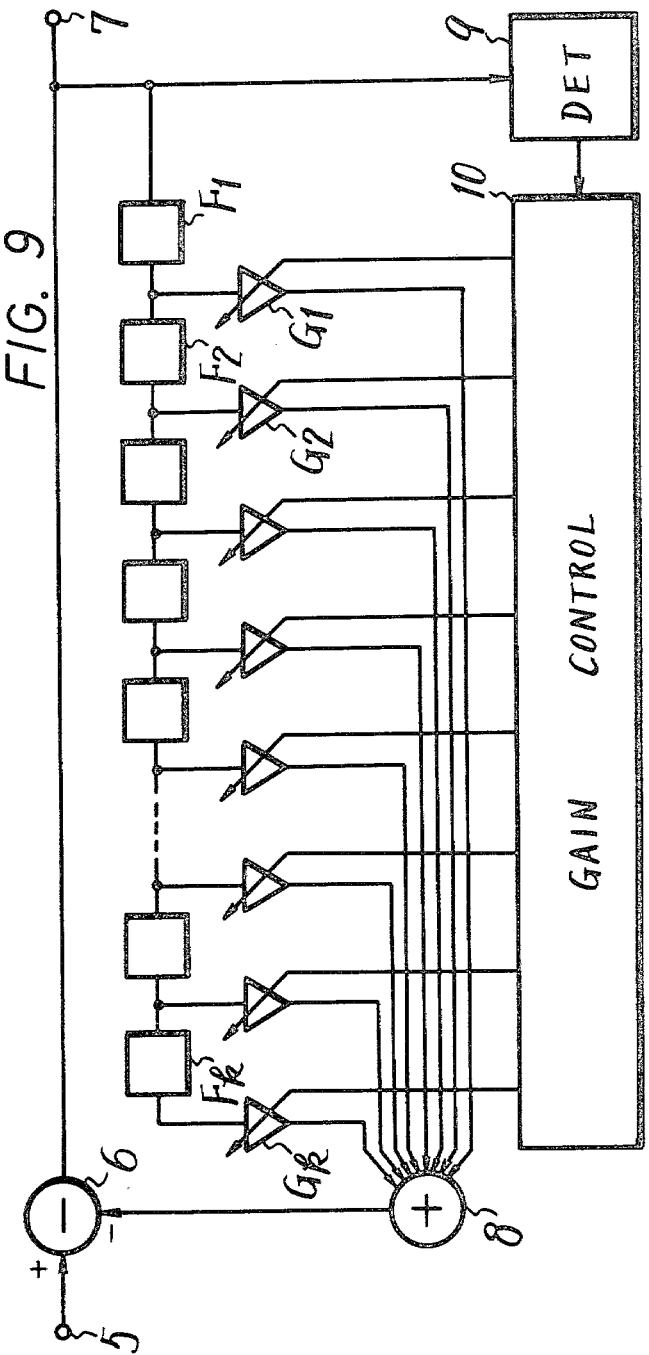

FIG. 10C'
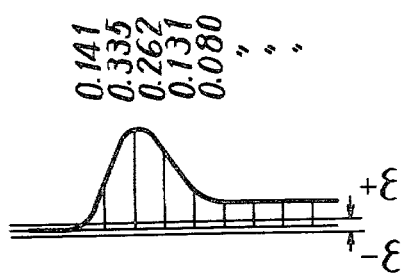
FIG. 10B"
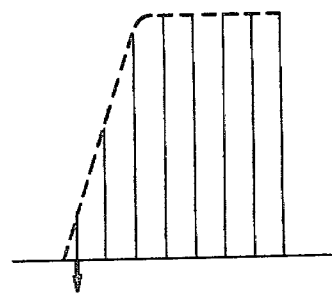
FIG. 10C"
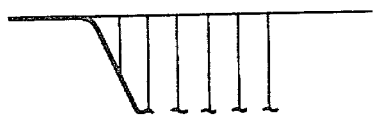

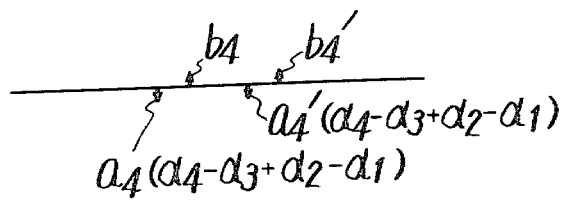
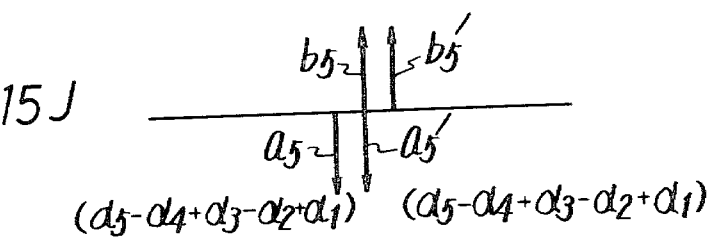

FIG. 19C  FIG. 19A  FIG. 19B
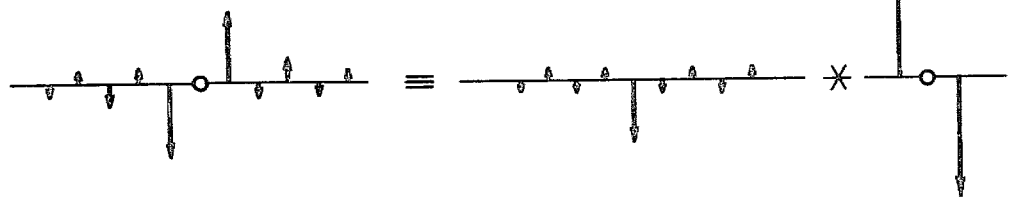
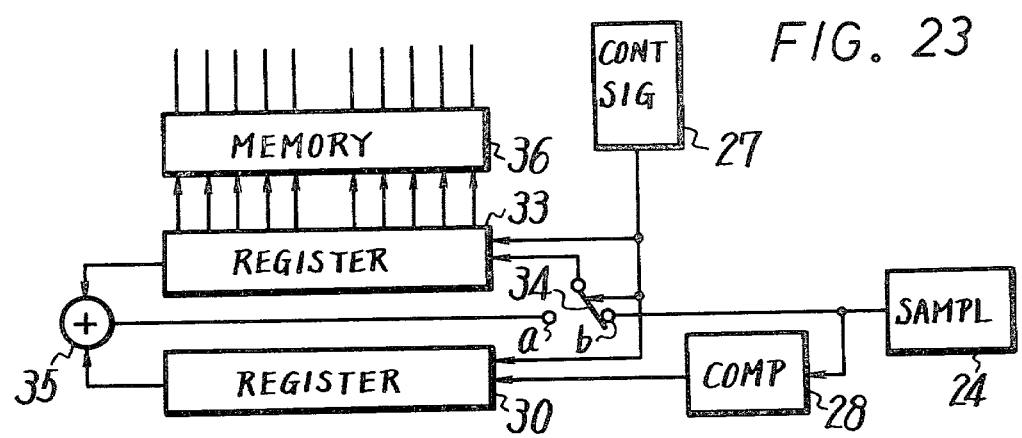
FIG. 23
FIG. 24
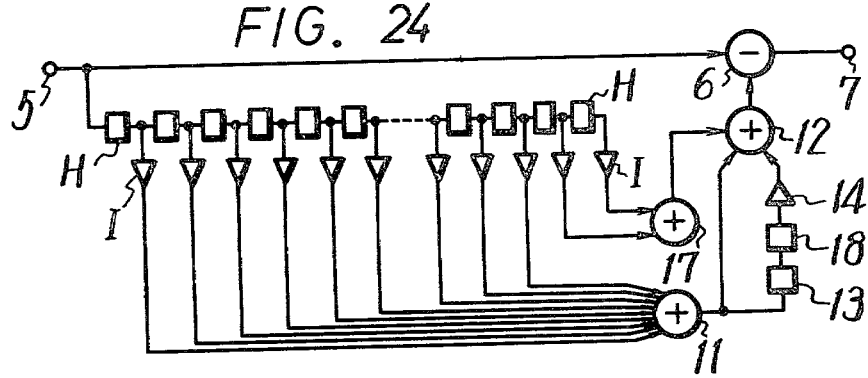
FIG. 25
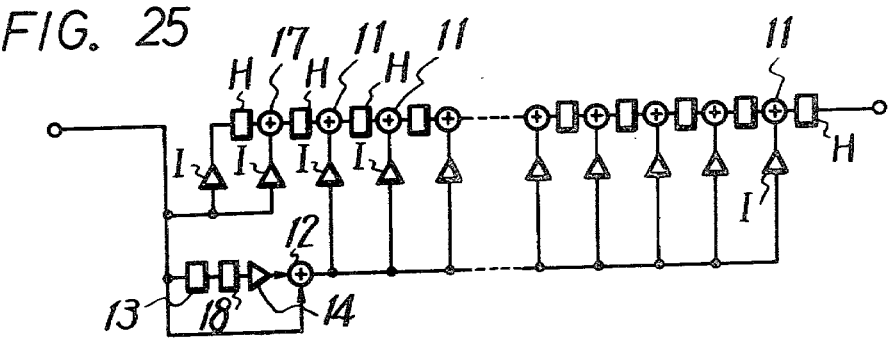

UNDESIRED SIGNAL CANCELLER

BACKGROUND OF THE INVENTION

1. Field of the Invention

The present invention relates to an undesired signal canceller in the vestigial sideband modulation system used in a television receiver and the like, and particularly is to design for cancelling undesired signals at a video amplifier stage after detection by using a widely-used transversal filter (electric charge transfer type programmable filter).

2. Description of the Prior Art

For better understanding, a description will first be given on transfer function representation of an undesired signal in the case that a signal of vestigial sideband modulation system is synchronously detected.

A received signal P(t) including an undesired signal is considered as a mixture of desired signal D(t) and undesired signal U(t), which is expressed as follows:

$$P(t) = D(t) + U(t) \tag{1}$$

The desired signal D(t) is a linear addition of a 0° or 180° out-of-phase component (hereinafter referred to as an in-phase component) g(t) and a 90° or 270° out-of-phase component (hereinafter referred to as a quadrature component) $g_\beta(t)$, which is expressed as follows:

$$D(t) = \tfrac{1}{2} g(t) \cos \omega_c t + \tfrac{1}{2} g_\beta(t) \sin \omega_c t \tag{2}$$

where g(t) is a video signal and $g_\beta(t)$ is expressed as follows:

$$g_\beta(t) = \frac{1}{2\pi} \int_{-\omega_c}^{\omega_c} W_\beta(\omega) G(\omega) e^{j\omega t} d\omega \tag{3}$$

where $$G(\omega) = \int_{-\infty}^{\infty} g(t) e^{-j\omega t} dt \tag{4}$$

Also, $W_\beta(\omega)$ is a vestigial sideband roll-off characteristic as shown in FIG. 1 and represented as follows:

$$W_\beta(\omega) = \begin{cases} -j \dfrac{\omega}{\beta} & |\omega| < \beta \\ -j \, \text{sgn}(\omega) & |\omega| > \beta \end{cases} \tag{5}$$

Meanwhile, an undesired wave (a single wave) passed through (i)th propagation path is expressed as follows:

$$U_i(t) = R_i D(t - \tau_i) \tag{6}$$

where $R_i$ is an amplitude ratio for the desired signal D(t) in a relation of $0 < R_i < 1$ when i is not zero and $R_i = 1$ when i is zero, and $\tau_i$ is a delay time (sec) which is greater than zero when i is not zero and zero when i is zero.

When the equation (2) is substituted into the equation (6), the following relation is obtained.

$$U_i(t) = \tfrac{1}{2} R_i g(t - \tau_i) \cos \omega_c(t - \tau_i) \tag{7}$$
$$\quad - \tfrac{1}{2} R_i g_\beta(t - \tau_i) \sin \omega_c(t - \tau_i)$$

If a carrier phase $\psi_i$(rad) is taken as follows:

$$0 \leq \psi_i \leq 2\pi \quad (i \neq 0)$$
$$\text{and } \psi_0 = 0 \quad (i = 0),$$

the following relation is obtained $$U_i(t) = \tfrac{1}{2} R_i g(t - \tau_i) \cos(\omega_c t - \psi_i) \tag{8}$$
$$\quad - \tfrac{1}{2} R_i g_\beta(t - \tau_i) \sin(\omega_c t - \psi_i)$$

where $\omega_c \tau_i = 2k\pi + \psi_i$ (k is integer).

In general, when n's number of undesired waves are present, the undesired signal U(t) is expressed as follows:

$$U(t) = \sum_{i=1}^{n} R_i D(t - \tau_i) \tag{9}$$
$$= \tfrac{1}{2} [\sum_{i=1}^{n} R_i g(t - \tau_i) \cos(\omega_c t - \psi_i)$$
$$\quad - \sum_{i=1}^{n} R_i g_\beta(t - \tau_i) \sin(\omega_c t - \psi_i)]$$

Thus, the received signal P(t) is expressed as follows:

$$P(t) = D(t) + U(t) \tag{10}$$
$$= \tfrac{1}{2} [\sum_{i=0}^{n} R_i g(t - \tau_i) \cos(\omega_c t - \psi_i)$$
$$\quad - \sum_{i=0}^{n} R_i g_\beta(t - \tau_i) \sin(\omega_c t - \psi_i)]$$

If the received signal P(t) is synchronous-detected at a phase difference of zero with the carrier phase of the desired signal D(t), the following video signal $p_0(t)$ is obtained.

$$p_0(t) = \tfrac{1}{2} g(t) \tag{11}$$
$$\quad + \tfrac{1}{2} [\sum_{i=1}^{n} R_i g(t - \tau_i) \cos \psi_i$$
$$\quad + \sum_{i=1}^{n} R_i g_\beta(t - \tau_i) \sin \psi_i]$$

If the equation (11) is subjected to Fourier transformation in consideration of the equation (3), the following equation is obtained.

$$P_0(\omega) = \tfrac{1}{2} G(\omega) \tag{12}$$
$$\quad + \tfrac{1}{2} [\sum_{i=1}^{n} R_i \cos \psi_i G(\omega) e^{-j\omega \tau_i}$$
$$\quad + \sum_{i=1}^{n} R_i \sin \psi_i W_\beta(\omega) G(\omega) e^{-j\omega \tau_i}]$$
$$= \tfrac{1}{2} G(\omega) [1 + H_{g0}(\omega)]$$

$$\text{where } H_{g0}(\omega) = \sum_{i=1}^{n} R_i \cos \psi_i e^{-j\omega \tau_i} \tag{13}$$
$$\quad + \sum_{i=1}^{n} R_i \sin \psi_i W_\beta(\omega) e^{-j\omega \tau_i}$$

In the above equations (12) and (13), $H_{g0}(\omega)$ is a transfer function of the undesired signal U(t) which is synchronous-detected at the video amplifier stage. Further, with the equation (13) being subjected to Fourier inverse-transformation, the impulse response of undesired signal U(t) at the propagation path is expressed as follows:

$$h_{g0}(t) = \sum_{i=1}^{n} R_i \cos \psi_i \delta(t - \tau_i) \tag{14}$$
$$\quad + \sum_{i=1}^{n} R_i \sin \psi_i \delta(t - \tau_i) * W_\beta(t)$$

-continued $$\text{where } W_\beta(t) = \frac{1}{2\pi} \int_{-\infty}^{\infty} W_\beta(\omega) e^{j\omega t} d\omega$$

and a mark * indicates convolution.

Now, the following relation is obtained from the equation (12):

$$G(\omega) = \frac{1}{1 - H_{r0}(\omega)} \cdot P_0(\omega) \quad (15)$$

Therefore, if $P_0(\omega)$ is multiplied by an inverse filter $H_{r0}(\omega)$ of the transmission system expressed as follows:

$$\frac{1}{1 - H_{r0}(\omega)} = H_{r0}(\omega) \quad (16)$$

the desired signal $G(\omega)$ only can be derived from the received signal $P_0(\omega)$. The inverse filter $H_{r0}(\omega)$ as expressed in the equation (16) can be realized by a construction called a feed-back system as shown in FIG. 2.

As described above, if it is possible to form a circuit simulating the transfer function of undesired signal $U(t)$ or its impulse response, the undesired signal $U(t)$ can be cancelled by forming an inverse filter which includes the above circuit in its feed-back loop.

As the above-mentioned circuit simulating the transfer function of undesired signal $U(t)$ or its impulse response, there has been proposed a circuit as shown in FIG. 3.

In FIG. 3, $A_1, A_2 \ldots A_n$ represent delay circuits respectively corresponding to delay times $\tau_1, \tau_2, \ldots \tau_n$ of undesired waves arrived passing through different propagation paths. These delay circuits $A_1$ to $A_n$ are connected in series and also have delay amounts of $$\tau_1 - \tau_D/2, \tau_2 - (\tau_1 - \tau_D/2), \ldots, \tau_n - (\sum_{i=1}^{n-1} \tau_i - \tau_D/2),$$

respectively.

Outputs of the delay circuits $A_1$ to $A_n$ are respectively fed to phase and level adjusting circuits $B_1$ to $B_n$ and $C_1$ to $C_n$. In accordance with levels $R_1$ to $R_n$ of undesired waves and phases $\psi_1$ to $\psi_n$ thereof, the adjusting circuits $B_1$ to $B_n$ respectively produce signals which are adjusted to $R_1 \cos \psi_1, R_2 \cos \psi_2, \ldots, R_n \cos \psi_n$, while the adjusting circuits $C_1$ to $C_n$ respectively produce signals which are adjusted to $R_1 \sin \psi_1, R_2 \sin \psi_2, \ldots, R_n \sin \psi_n$.

Thus adjusted signals from the circuits $B_1$ to $B_n$ and $C_1$ to $C_n$ are respectively supplied to adders $1a$ and $1b$. In the adder $1a$, with respect to undesired wave as shown in FIG. 4A, a pulse signal proportional to the level of an in-phase component of the undesired wave is formed $\tau_D/2$ before the generation of the undesired wave as shown in FIG. 4B. Also, in the adder $1b$, a pulse signal proportional to the level of a quadrature component of undesired wave is formed $\tau_D/2$ before the generation of the undesired wave as shown in FIG. 4C.

A signal from the adder $1a$, which is proportional to the level of in-phase component is supplied to a delay circuit $2a$ having a delay time of $\tau_D/2$ to form a signal as shown in FIG. 4D, which is equivalent to the impulse response of the in-phase component of undesired wave.

A signal from the adder $1b$, which is proportional to the level of quadrature component, is supplied to a filter $2b$ having characteristics corresponding to the impulse response of vestigial sideband roll-off characteristic as shown in FIG. 5.

The filter $2b$ is formed with a transversal filter as shown in FIG. 6. In other words, delay circuits $D_1$ to $D_m$ corresponding to each sampling period T are connected in series, and outputs of these delay circuits $D_1$ to $D_m$ are respectively fed through level adjusting circuits $E_1$ to $E_l$ to adders 4. The level adjusting circuits $E_1$ to $E_l$ are given with sampled values of impulse response shown in FIG. 5. The sampling frequency $f = 1/T$ is selected to be more than two times the video signal frequency band and, for example, three times or four times the color subcarrier frequency.

Then, the filter $2b$ has derived therefrom a signal which is equivalent to the impulse response of quadrature component of undesired wave as shown in FIG. 4E. This signal from the filter $2b$ is applied to an adder 3 where it is added to the signal from the delay circuit $2a$ thereby to form a signal which is equal to the undesired wave (FIG. 4A).

Accordingly, if the above circuit of FIG. 3 is provided in the feed-back loop of FIG. 2, the undesired signal can be well removed. This effect was also noticed from computer simulation and circuit experiments.

In this method, however, the undesired signal is divided into an in-phase component and a quadrature component so as to be cancelled therefrom. As a result, it is required to separate these in-phase component and quadrature component for detection so that the above procedures become complicated. Thus, this circuit is not suitable for automatic cancellation of undesired signals.

As a method of automatically detecting the undesired signal $U(t)$, there is used a vertical synchronizing signal in a standard television signal. This signal is defined, for example, as shown in FIG. 7 by Japanese Radio Law, in which no signal appears during an interval of 29.3 micro seconds ($\mu$s) from an equalizing pulse and an interval of 27.3 $\mu$s up to the vertical notch. Besides, the vertical synchronizing signal is of a step responsive waveform. Therefore, when an undesired signal exists, the flat portion of the vertical synchronizing signal is distorted and this distortion will represent response characteristics of a transmission path of a television signal. Accordingly, parameters of the filter $H_{r0}(\omega)$ may be so established that this distortion is less than the permitted limit.

In this case, it is considered that an undesired wave of in-phase component as shown in FIG. 8C is produced as a result that an impulse of in-phase component having a level of $-0.5$ which is delayed from the reference signal (vertical synchronizing signal) by $\tau_1 = kT$ as shown in FIG. 8B is convolution-integrated with the reference signal shown in FIG. 8A.

Accordingly, there has been proposed a device using a transversal filter as shown in FIG. 9. In this circuit, a video signal including an undesired wave is supplied from an input terminal 5 through a subtractor 6 to an output terminal 7. Delay circuits $F_1$ to $F_k$ corresponding to sampling period T are connected in series and the output signal from the subtracter 6 is applied to the delay circuit $F_1$. Outputs of the delay circuits $F_1$ to $F_k$ are respectively fed through level adjusting circuits $G_1$ to $G_k$ to an adder 8 the output of which is supplied to the subtracter 6. Further, the output signal of the subtracter 6 is also supplied to an undesired signal detecting circuit 9. An output of this detecting circuit 9 is applied to a gain control circuit 10 which controls gains of the level adjusting circuits $G_1$ to $G_k$.

With the circuit of FIG. 9, a given reference level $\epsilon$ is established at the detecting circuit 9. When an undesired signal exists at the flat portion of the vertical synchronizing signal, a time point at which the level of the undesired signal first exceeds the level $\epsilon$ is detected on the time basis so that one of the level adjusting circuits $G_1$ to $G_k$ corresponding to the above time point is controlled in gain to produce a predetermined impulse. Thus, the gains of level adjusting circuits will be adjusted until the level of the undesired signal is lowered to $\epsilon$ or less.

With the arrangement as mentioned above, the impulse as shown in FIG. 8B is convolution-integrated with the reference signal by the transversal filter to form the signal as shown in FIG. 8C and this signal is subtracted from the reference signal shown in FIG. 8A so that the undesired signal can be cancelled.

In the circuit of FIG. 9, however, the impulse is convolution-integrated as mentioned above and hence a signal fed to the subtracter 6 will have a stepped waveform. For this reason, there is no problem when the undesired signal is only in-phase components as shown in FIG. 8C, but when the undesired signal is quadrature component approximated to a differential waveform, the undesired signal can not be cancelled, and the component of undesired signal will contrarily become large.

For example, with respect to a quadrature component as shown in FIG. 10A (numerals indicate levels with that of the reference signal being taken as 1.000), if a suitable impulse is formed at a point where the undesired signal is first risen above the reference level $\epsilon$, this impulse is convolution-integrated to form a signal as shown in FIG. 10B which is supplied to the subtracter 6. In FIG. 10B, an arrow denotes the impulse. The subtracter 6 then produces a signal as shown in FIG. 10C. These figures such as FIG. 10B, 10C, etc. show only a portion of undesired signal.

With respect to the signal shown in FIG. 10C, a second impulse is formed at a point where the undesired signal is first risen above the level $\epsilon$. Thus, the subtracter 6 is applied with a signal as shown in FIG. 10B' to produce a signal as shown in FIG. 10C'.

Furthermore, with respect to the signal shown in FIG. 10C', when a third impulse is similarly formed, the subtracter 6 is supplied with a signal as shown in FIG. 10B'' to produce a signal as shown in FIG. 10C''. As illustrated, the level of undesired signal at a time point where the third impulse is formed becomes about three times as large as that of the initial undesired signal, so that if the above process is repeated, the level of undesired signal will be further enhanced. Accordingly, it is not suitable to use this method in the transmission system including an undesired signal of quadrature component for cancelling the undesired signal. On the other hand, with the circuit of FIG. 9, there has been proposed a method of using the detecting circuit 9 to produce a differential waveform of an undesired signal thereby to control the gain of a level adjusting circuit. Since an output of the transversal filter is an integrated waveform of an impulse, if the differential waveform of undesired signal is supplied to the transversal filter, a signal approximated to the undesired signal can be formed.

In this case, however, the waveform of the vertical synchronizing signal is not a perfect step shape but a little gentle in slope as shown in FIG. 11A. Therefore, the undesired signal also has a rising portion with a gentle slope so that such an undesired signal is differentiated to form a signal having a constant width as shown in FIG. 11B. When this differential waveform is convolution-integrated by the transversal filter, a signal having a more gentle rising portion is formed as shown in FIG. 11C. Even if this signal is supplied to the subtracter 6, an undesired signal as shown in FIG. 11D will remain at the output side of the subtracter 6.

As shown in FIGS. 11B' and 11C', it is also possible that the level adjusting circuit to be controlled is shifted forward one by one. In this case, however, there still remains an undesired signal as shown in FIG. 11D'. An effect according to this method is the same for quadrature components.

As described above, the prior art methods have drawbacks such that automatic cancellation of undesired signals is improper, quadrature components thereof can not be eliminated completely, a residual undesired signal appears or the like.

SUMMARY OF THE INVENTION

It is an object of this invention to provide an undesired signal canceller free from the above defects of the prior art examples.

It is another object of this invention to provide an undesired signal canceller which can cancel both of in-phase component and quadrature component of an undesired signal at the same time with a simple construction.

It is a further object of this invention to provide an undesired signal canceller which can cancel an undesired signal with almost no residual undesired signal being produced.

It is a further another object of this invention to provide an undesired signal canceller which is suitable for automatic cancellation.

According to the main feature of this invention, there is provided an undesired signal canceller having a programmable filter in which differential waveforms or components of a desired signal are superimposed on one another to form a composite signal similar to an undesired signal, a control circuit for detecting a level of the undesired signal thereby to control the gain of a level adjusting circuit of the programmable filter so as to have a value proportional to the undesired signal, and a subtracter for subtracting the composite signal from an input signal.

The other objects, features and advantages of the present invention will be apparent from the following description taken in conjunction with the accompanying drawings.

BRIEF DESCRIPTION OF THE DRAWINGS

FIGS. 8A to 8C are views used for explaining a method of automatically detecting the undesired signal;

FIG. 9 is a systematic view showing a fundamental construction of an automatic undesired signal canceller;

FIGS. 13A to 13H, FIGS. 14A and 14B, and FIGS. 15A to 15K are views respectively used for explaining the circuit of FIG. 12;

FIGS. 17A and 17B, FIGS. 18A to 18D, and FIGS. 19A to 19C are views respectively used for explaining the embodiment of FIG. 16;

FIG. 23, FIG. 24 and FIG. 25 are systematic views respectively showing another constructions of the undesired signal canceller of this invention.

DESCRIPTION OF THE PREFERRED EMBODIMENTS

A description will next be given on one embodiment of this invention with reference to FIG. 12, etc.

Figure 1:
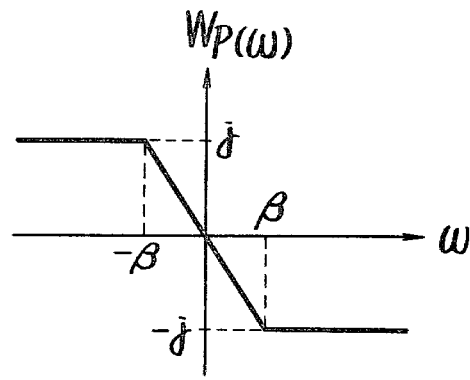
FIG. 1 is a view used for explaining a characteristic of an undesired signal.
Figure 2:
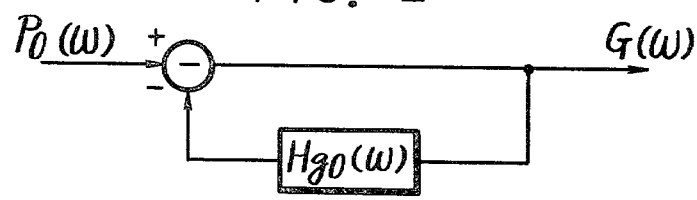
FIG. 2 is a schematic diagram showing a feed-back system constitution used for explaining this invention.
Figure 3:
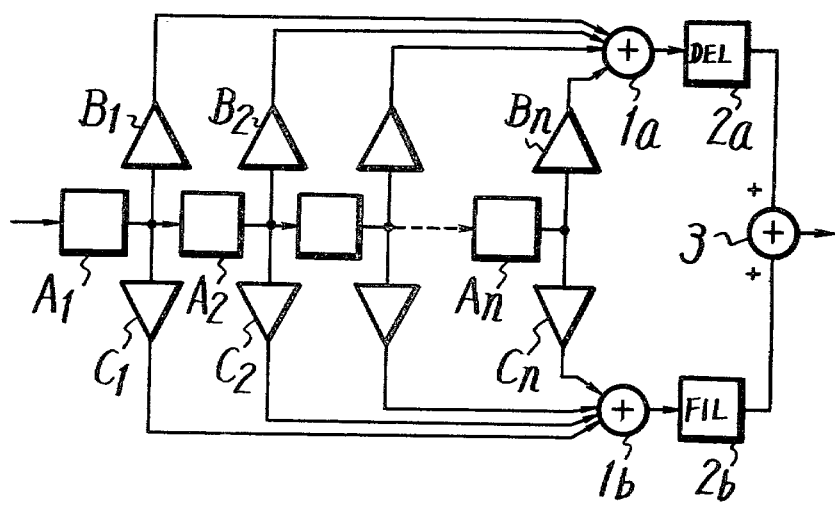
FIG. 3 is a circuit diagram for simulating transfer function of an undesired signal.
Figure 4A:
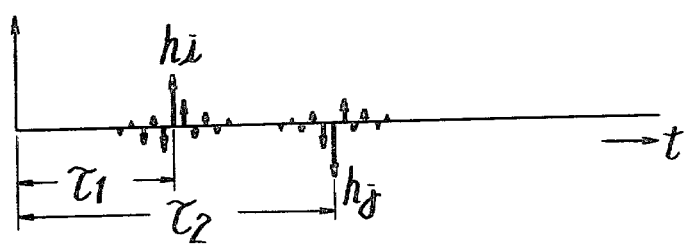
FIGS. 4A to 4E and FIG. 5 are views used for explaining the circuit of FIG. 3.
Figure 4B:
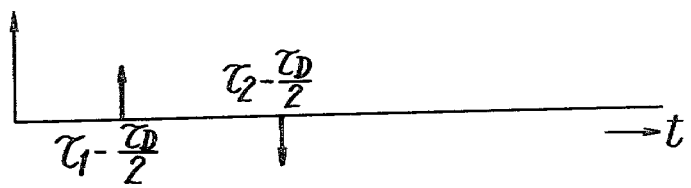
Figure 4C:
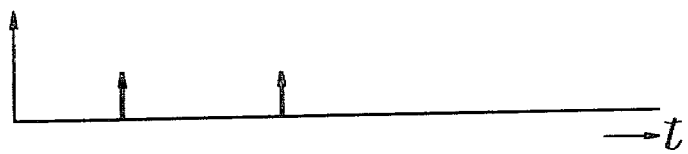
Figure 4D:
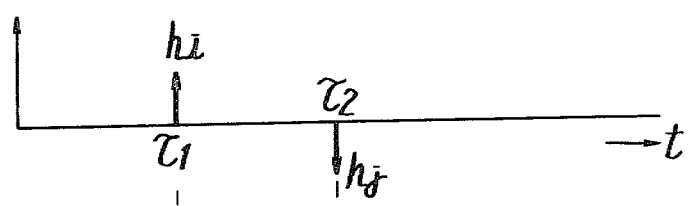
Figure 4E:
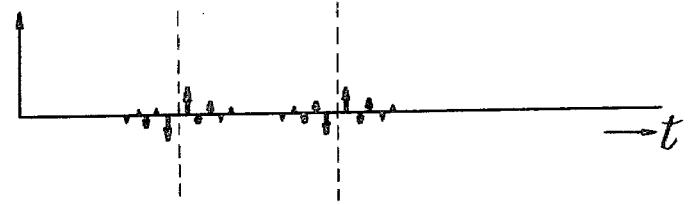
Figure 5:
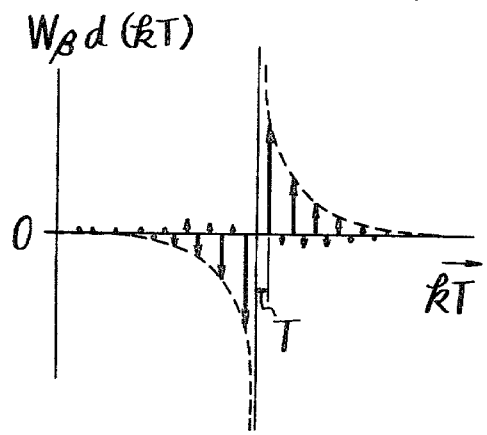
Figure 6:
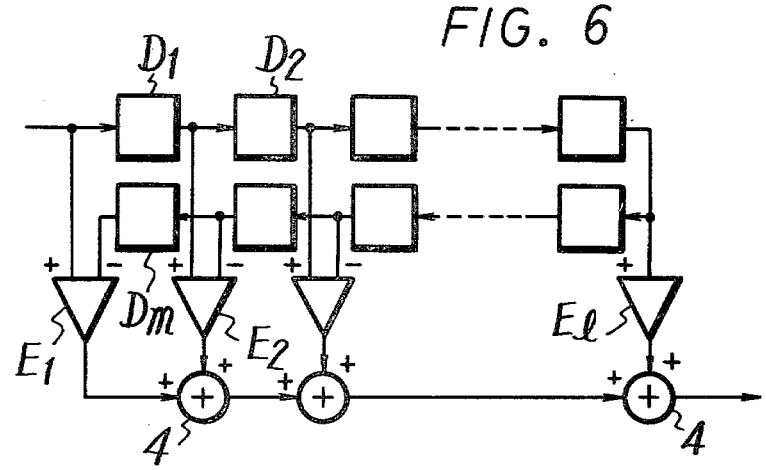
FIG. 6 is a systematic view showing a transversal filter used in the circuit of FIG. 3.
Figure 7:
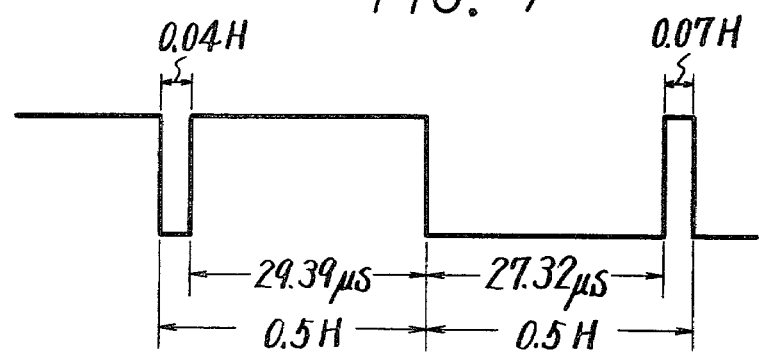
FIG. 7 is a view showing a waveform of a vertical synchronizing signal used as a reference signal for detecting an undesired signal.
Figure 10A:
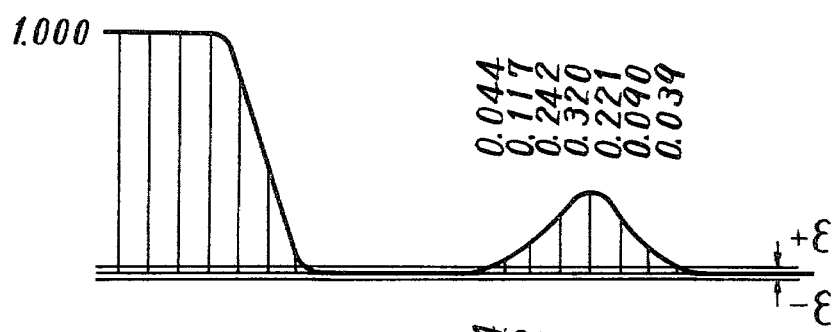
FIGS. 10A and 10C, 10B′, 10C′, 10B″, 10C″, 11A to 11D, 11B′, 11C′ and 11D′ are views used for explaining the circuit of FIG. 9.
Figure 10B:
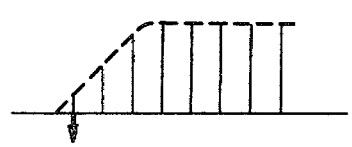
Figure 10C:
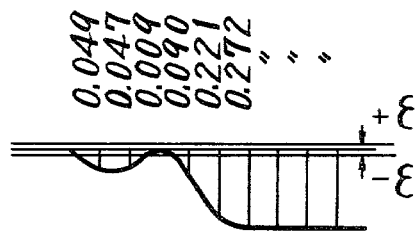
Figure 10B:
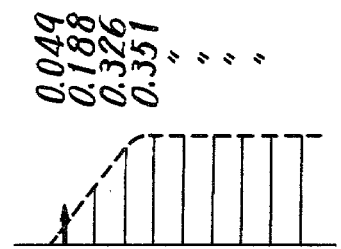
Figure 11A:
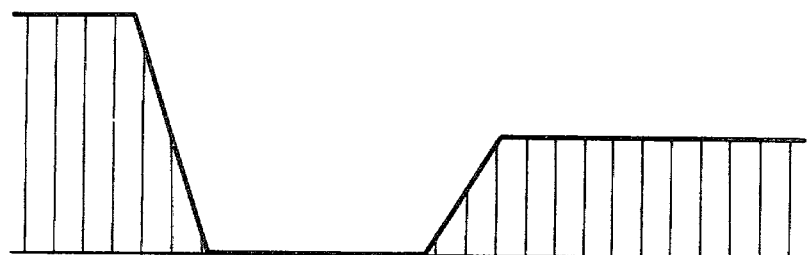
Figure 11B:
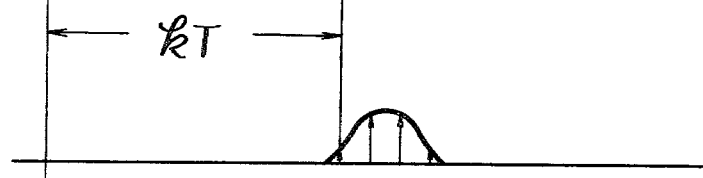
Figure 11C:
Figure 11D:
Figure 11B:
Figure 11C:
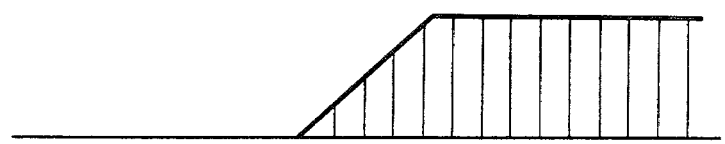
Figure 11D:
Figure 12:
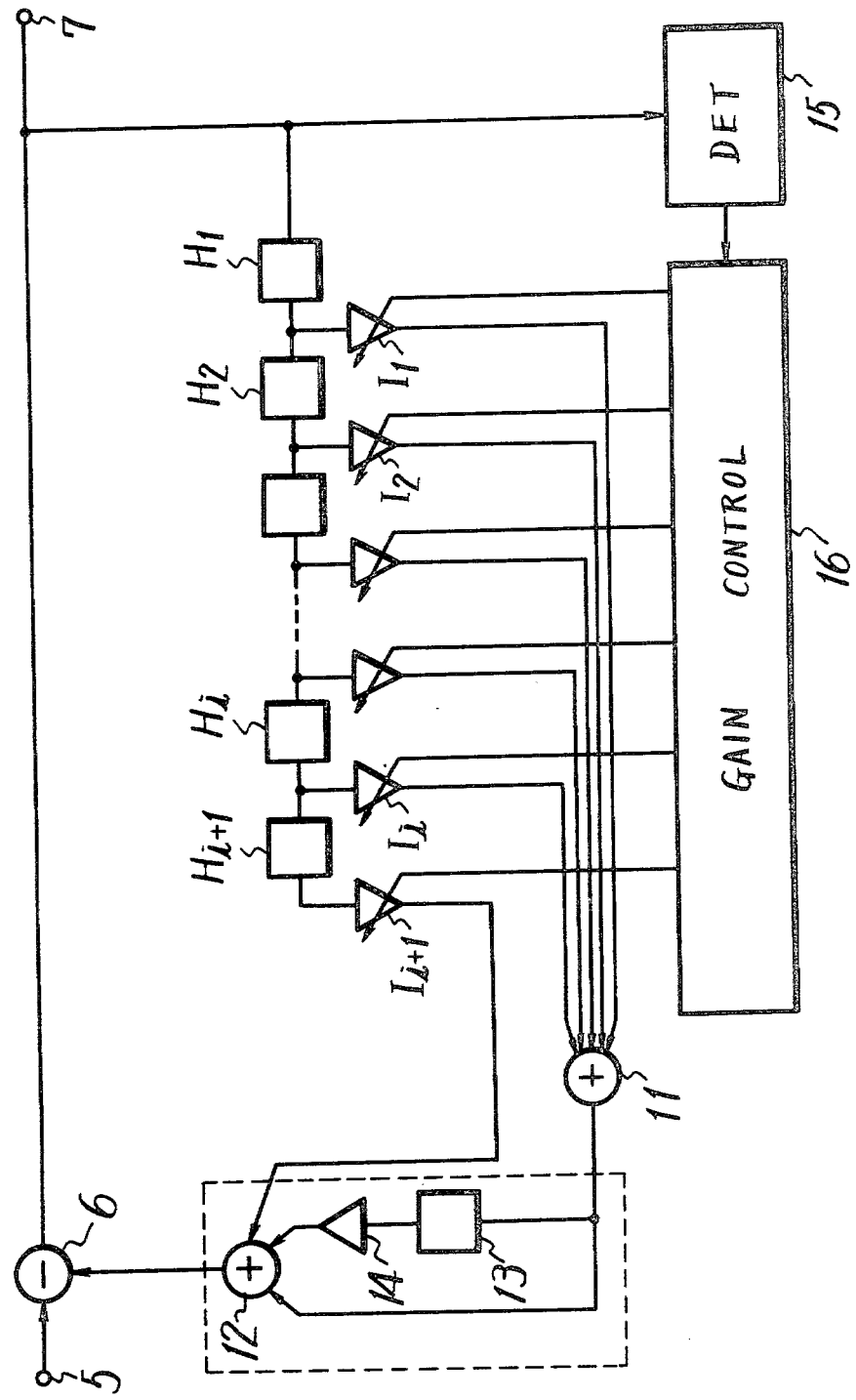
FIG. 12 is a systematic view showing one embodiment of an undesired signal canceller according to this invention.

In FIG. 12, delay circuits $H_1$ to $H_{i+1}$ (where $i \approx 27.3$ μs/T) are connected in series in accordance with the sampling period T. An output signal of a subtracter 6 is supplied to the delay circuit $H_1$ and the outputs of the delay circuits $H_1$ to $H_i$ are respectively fed through level adjusting circuits $I_1$ to $I_i$ to create sequentially delayed replicas of corresponding differential components of the desired signal which are fed to an adder 11. In addition, a delayed replica is also connected to an adder 12. An output signal from the adder 11 is supplied directly to the adder 12 and also through a delay circuit 13 corresponding to the sampling period T and an inverter 14 (functioning as a differentiation circuit) to the adder 12. An output signal from the delay circuit $H_{i+1}$ is also supplied through a level adjusting circuit $I_{i+1}$ to the adder 12. Then, a signal from the adder 12 is supplied to the subtracter 6.

A circuit 15 is provided to detect the level of an undesired signal within an interval of the aforesaid vertical synchronizing signal at every sampling period T. Detected signals from the circuit 15 are fed to a gain control circuit 16, which controls the gains of level adjusting circuits $I_1$ to $I_{i+1}$ one after another from the least suffix number thereof so that the gain of each adjusting circuit becomes substantially proportional to each level of undesired signal.

In the circuit of FIG. 12, the undesired signal of in-phase component will be eliminated in a manner as hereinbelow mentioned.

Figure 13A:
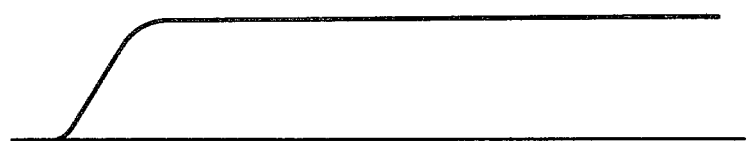
Figure 13B:
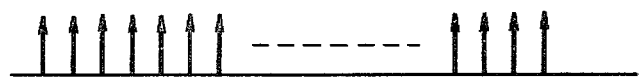
Figure 13C:
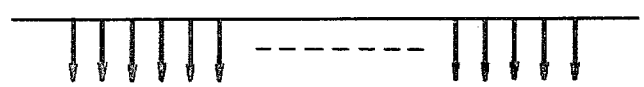
Figure 13D:
Figure 13E:
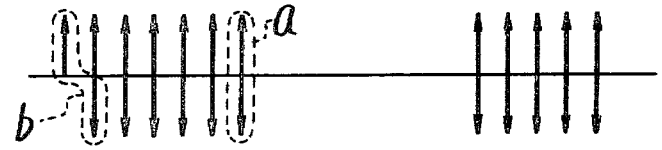
Figure 13F:
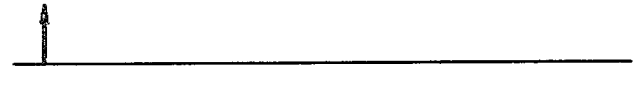

That is, with respect to an undesired signal as shown in FIG. 13A, when the gains of the adjusting circuits $I_1$ to $I_{i+1}$ are controlled so as to be proportional to the levels of the undesired signal and an impulse is applied to the input of the delay circuit $H_1$, the adder 11 will produce a train of impulse as shown FIG. 13B and the inverter 14 has derived therefrom a train of impulses as shown in FIG. 13C. The adjusting circuit $I_{i+1}$ also produces a train of impulses as shown in FIG. 13D. These impulse trains are added together at the adder 12 as shown in FIG. 13E, in which impulses opposite in phase to each other such as, for example, indicated by a dotted line a are cancelled each other. As a result, the composite signal from the adder 12 will become equivalent to an impulse which is erected at a rising portion of the undesired signal as shown in FIG. 13F. Thus, the in-phase component of undesired signal is eliminated in the same manner as in the circuit of FIG. 9.

Figure 13G:
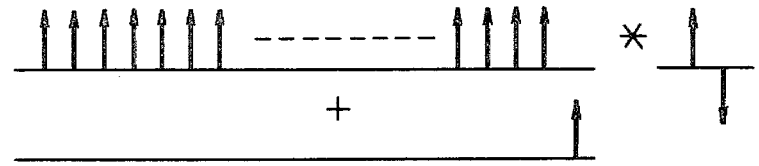
Figure 13H:
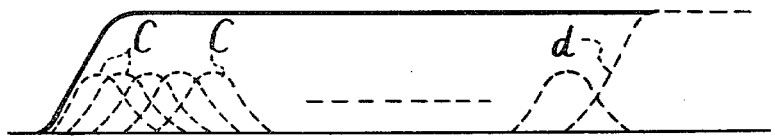
Figure 14A:
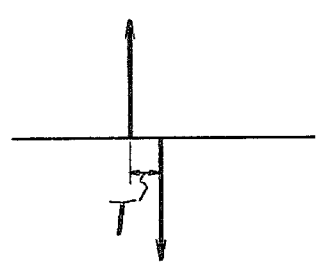
Figure 14B:

In other words, the signal shown in FIG. 13E is considered to be formed in such a manner that a pair of impulses having an interval T therebetween as shown by a dotted line b is convolution-integrated by the impulse train of FIG. 13B and further the impulse of FIG. 13D is added thereto, as shown in FIG. 13G. In this case, when an impulse pair as shown in FIG. 14A is convolution-integrated with a reference step waveform, there is obtained a signal c as shown in FIG. 14B which is approximated to the differential waveform of step waveform. Accordingly, if a plurality of signals c are overlapped and further a step waveform d formed by the convolution integral of impulse shown in FIG. 13D is added thereto, there is obtained a signal as shown in FIG. 13H which is approximated to the undesired signal of FIG. 13A. The above composite signal is supplied to the subtracter 6 so that the in-phase component of undesired signal can be cancelled.

Figure 15A:
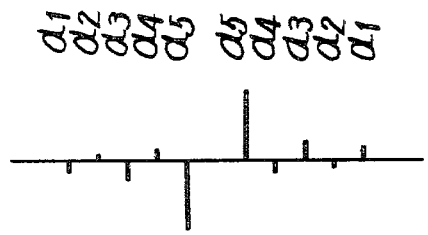
Figure 15B:
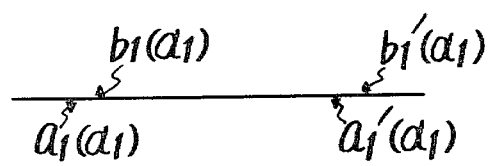
Figure 15C:
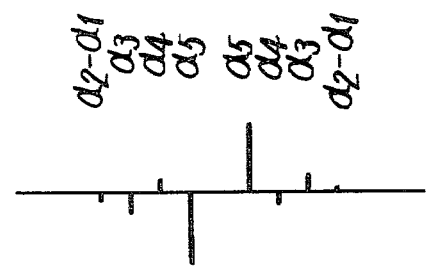
Figure 15D:
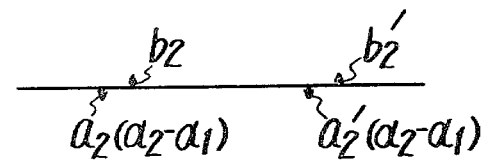
Figure 15E:
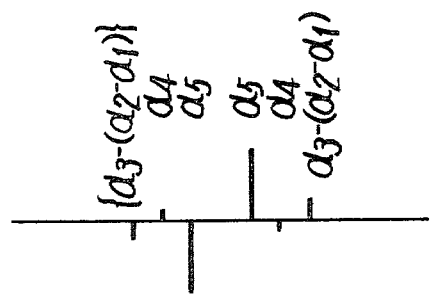
Figure 15F:
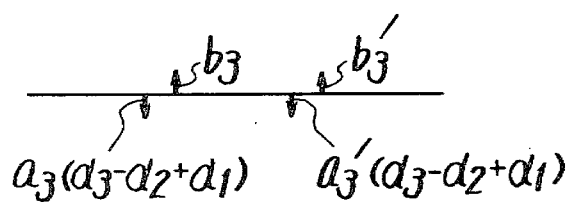
Figure 15H:
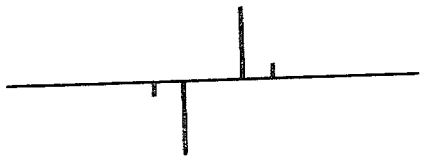
Figure 15J:
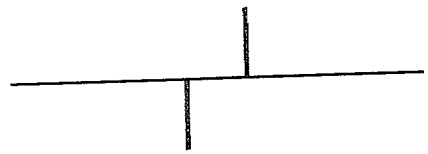

The quadrature component of undesired signal is also cancelled in the manner as mentioned below. It will be shown hereinafter that the impulse response of quadrature component is formed by the convolution integral of the impulse pair of FIG. 14A and the impulse train of FIG. 15K. That is, FIG. 15A shows the impulse response of quadrature component, in which $a_1$ to $a_5$ respectively denote each level thereof. For this impulse response, impulses $a_1$ and $a_1'$ are first formed in accordance with the outermost impulse responses as shown in FIG. 15B. At the right side in the figure, the impulse $a_1'$ of reverse polarity is formed at a one-period earlier position. Then, the impulses $a_1$ and $a_1'$ are convolution-integrated with the paired impulses shown in FIG. 14A to form impulses $b_1$ and $b_1'$. These impulses $a_1$, $a_1'$ and $b_1$, $b_1'$ are deducted from the original impulse response to represent a state as shown in FIG. 15C. Further, for this residual impulse response, impulses $a_2$ and $a_2'$ are formed in accordance with the outermost impulse responses as shown in FIG. 15D. In the similar manner, impulses $a_1$ to $a_5$ and $a_1'$ to $a_5'$ are formed with the result that the quadrature component is eliminated as shown in FIGS. 15E to 15J.

Figure 15K:
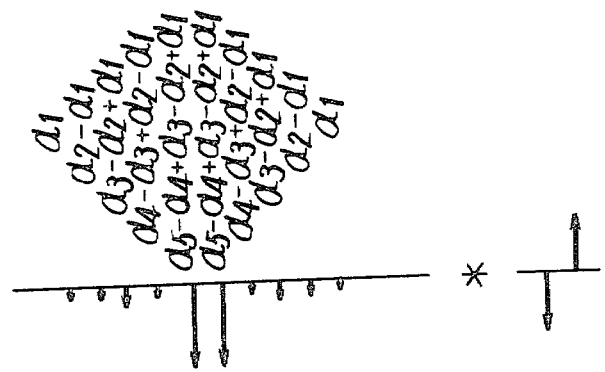

Accordingly, the level adjusting circuits $I_1$ and $I_{i+1}$ are controlled in gain so as to form the impulses shown in FIGS. 15B, 15D, 15F, 15H and 15J (refer to FIG. 15K). Thus, the impulse train mentioned above is convolution-integrated with the paired impulses shown in FIG. 14A to form an impulse train which is approximated to the impulse response of quadrature component. This impulse train is then supplied to the subtracter 6 so that the quadrature component of undesired signal is cancelled.

In this case, the level of thus formed impulse train (FIG. 15K) is approximated to the level of undesired signal. Therefore, when the level of undesired signal is detected by the detecting circuit 15 and the gains of adjusting circuits $I_1$ to $I_{i+1}$ are controlled in accordance with the detected levels, the aforesaid impulse train can be easily formed.

According to this invention, when eliminating the undesired signal, the in-phase component and quadrature component are arranged to be cancelled in the same manner. Therefore, satisfactory cancellation can be achieved with a simple construction and almost no residual undesired signal will be generated.

Figure 16:
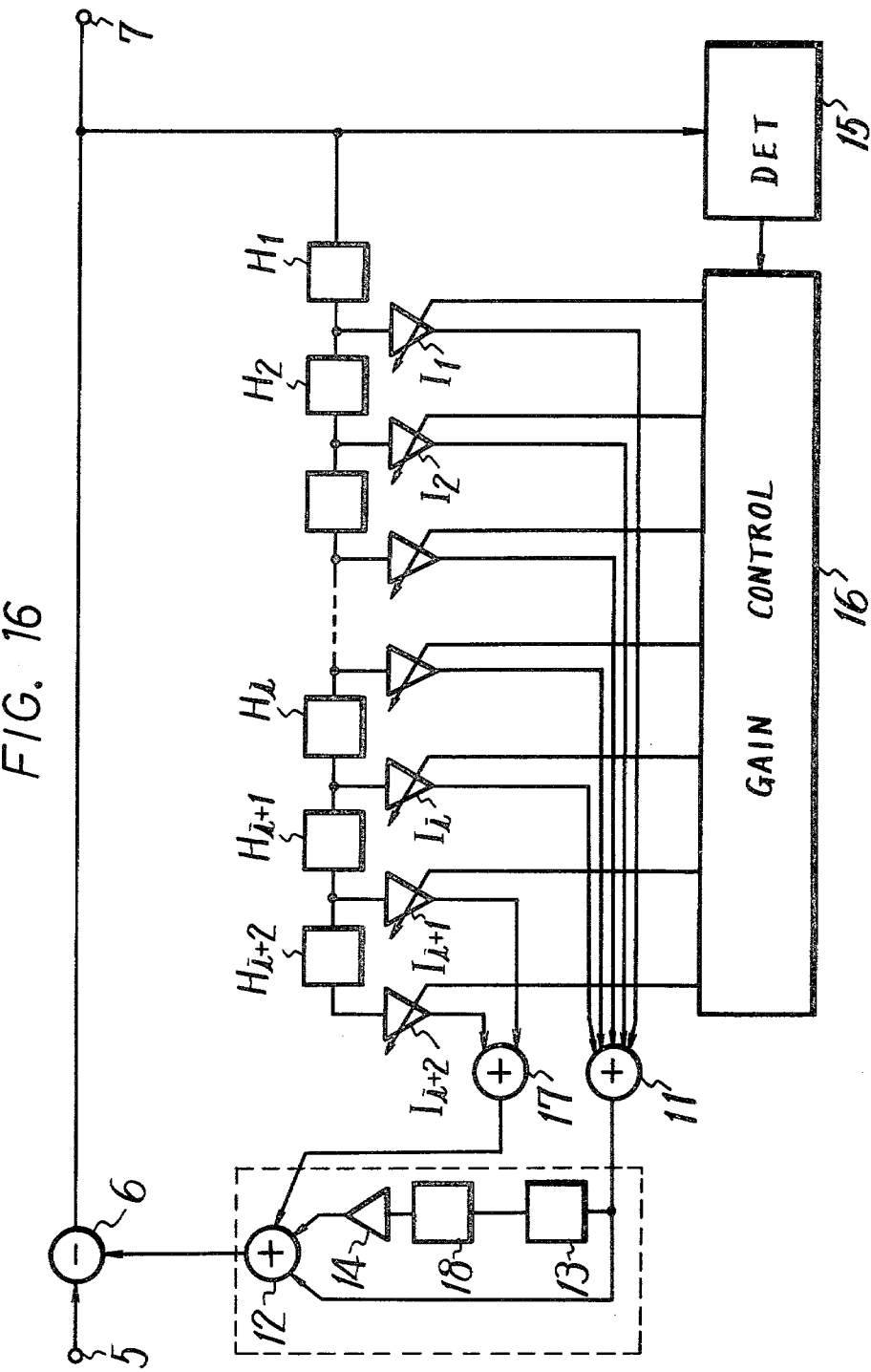
FIG. 16 is a systematic view showing another embodiment of an undesired signal canceller according to this invention.

FIG. 16 shows another embodiment of this invention. In this example, a delay circuit $H_{i+2}$ and a level adjusting circuit $I_{i+2}$ are provided following the delay circuit $H_{i+1}$, and also a signal from the level adjusting circuit $I_{i+2}$ is fed to an added 17 where it is added to the signal from the level adjusting circuit $I_{i+1}$. In addition, between the delay circuit 13 and the inverter 14 is inserted another delay circuit 18 which is equivalent to the delay circuit 13.

Figure 17A:
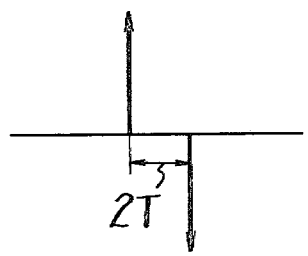
Figure 17B:
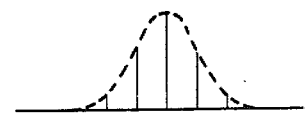

With such an arrangement, when paired pulses having an interval 2T therebetween as shown in FIG. 17A are formed and these paired impulses are convolution-inegrated with the step waveform of reference signal, there can be obtained a waveform which is approximated to a differential waveform of FIG. 17B.

Figure 18A:
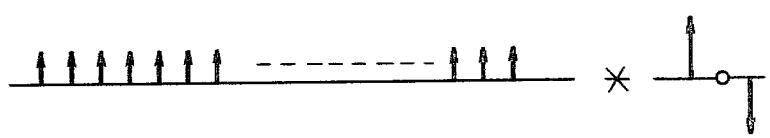
Figure 18B:
Figure 18C:
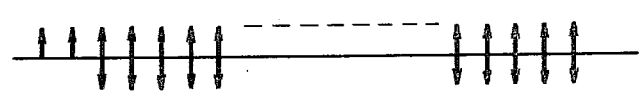
Figure 18D:

When the undesired signal is in-phase component, an impulse train as shown in FIG. 18A, which is produced by level-detecting the undesired signal, is convolution-integrated with the paired impulses of FIG. 17A and further impulses as shown in FIG. 18B from the level adjusting circuits $H_{i+1}$ and $H_{i+2}$ are added thereto to form an impulse train as shown in FIG. 18C which is approximated to the impulse response of in-phase component shown in FIG. 18D.

When the undesired signal is quadrature component, an impulse train as shown in FIG. 19A obtained by detecting the level of the undesired signal is convolution-integrated with a pair of impulses shown in FIG. 19B thereby to form an impulse train of quadrature component as shown in FIG. 19C which is same as that of FIG. 15A.

Figure 20:
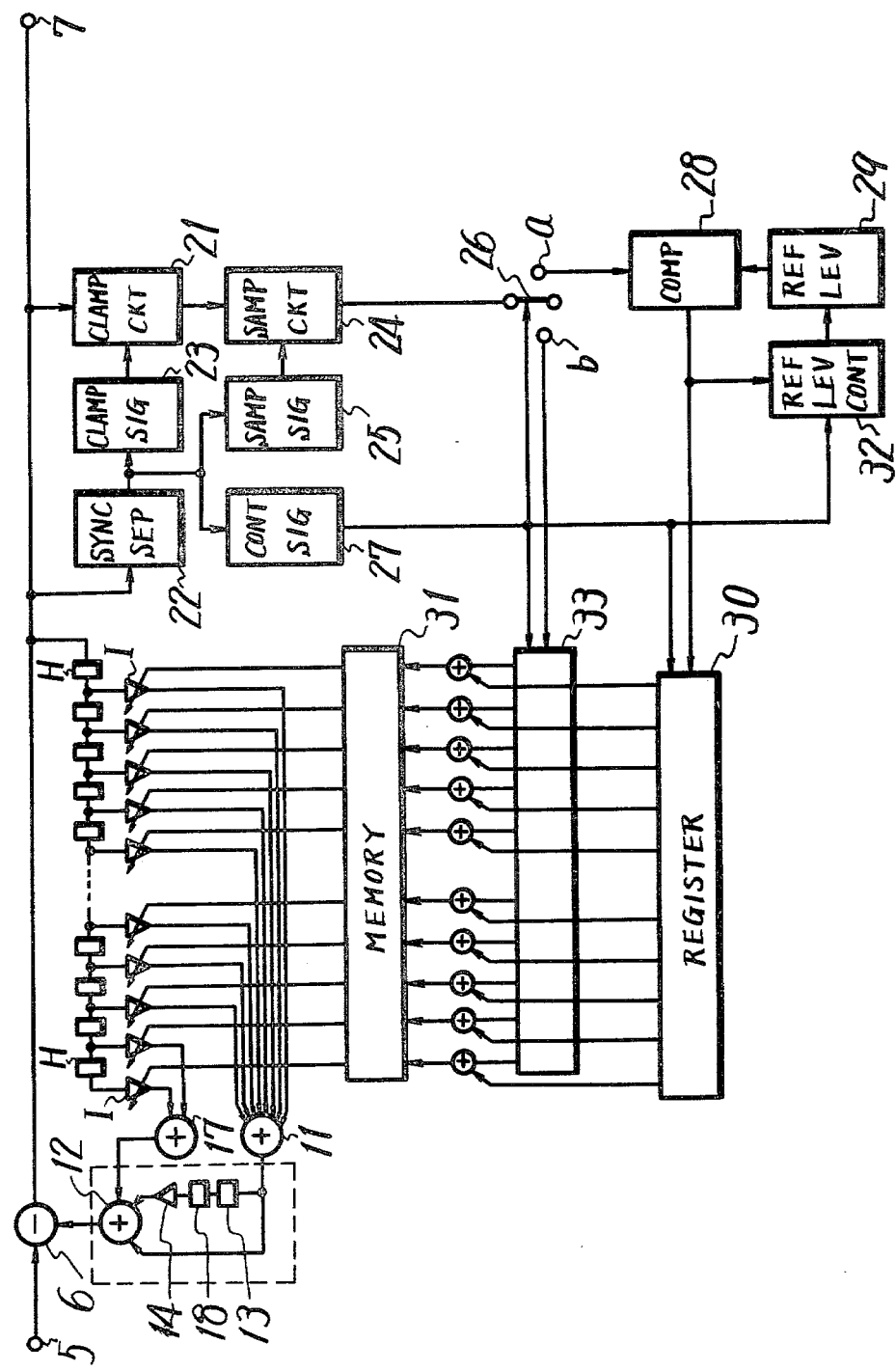
FIG. 20 is a systematic view showing one embodiment of an automatic undesired signal canceller applied with this invention.

FIG. 20 shows a circuit arrangement for automatically controlling the gains of level adjusting circuits I so as to form a suitable impulse train by detecting the levels of an undesired signal. In the circuit of FIG. 20, an output signal of a subtracter 6 is supplied to a clamp circuit 21. The output signal of the subtracter 6 is also supplied to a synchronizing signal separator circuit 22 to separate a vertical synchronizing signal and a horizontal synchronizing signal. The vertical synchronizing signal therefrom is applied to a clamp signal forming circuit 23 to form a clamp signal. This clamp signal is fed to the clamp circuit 21 so that the DC level of the video signal is clamped to a predetermined level at every vertical interval.

The clamped signal is supplied to a sampling circuit 24. At the same time, the horizontal synchronizing signal from the separator circuit 22 is supplied to a sampling signal forming circuit 25 to produce a sampling signal which is synchronized with the horizontal synchronizing signal and has a frequency of, for example, three or four times the color subcarrier frequency. This sampling signal is supplied to the sampling circuit 24 to produce a clamped video signal at every sampling period.

The clamped video signal from the sampling circuit 24 is supplied to a switch 26. At the same time, the vertical synchronizing signal from the separator circuit 22 is fed to a control signal forming circuit 27 to produce a control signal which corresponds to the interval 27.3 $\mu$s of a reference signal in each vertical synchronizing signal.

This control signal is supplied to the switch 26 to change it over to a contact a so that the signal sampled during the reference signal is supplied therethrough to a level comparator circuit 28. A potential signal of +Vth or −Vth is also supplied to the comparator 28 from a reference level forming circuit 29. In this comparator circuit 28, when the potential of the video signal is more than +Vth, a signal of +Δh is produced, when between +Vth and −Vth, a signal of zero (0) is formed, and when less than −Vth, a signal of −Δh is produced.

A signal from the comparator circuit 28 is supplied to a register 30. Also, the control signal from the control signal forming circuit 27 is fed to the register 30 as its control signal so that the signal from the comparator circuit 28 is stored in each bit of the register 30 at every sampling period.

The signals thus stored in respective bits of the register 30 are read out in a parallel manner and the read-out signals are fed to a memory 31 having the same number of bits as those of the register 30. In the memory 31, the level of supplied signal is stored and the total level of repeatedly supplied signals is also stored. The signals obtained at respective bits of the memory 31 are applied to level adjusting circuits I to control the gains thereof in accordance with the levels of the signals.

The reference level formed at the forming circuit 29 is established to a high level at the beginning. When the undesired signal is cancelled to lower its level and the output signals of the comparator 28 become "0" continuously, the above signals are detected by a reference level control circuit 32 so that the reference level is changed-over to a lower level at a time point when the control signal from the forming circuit 27 has been terminated.

Figure 21A:
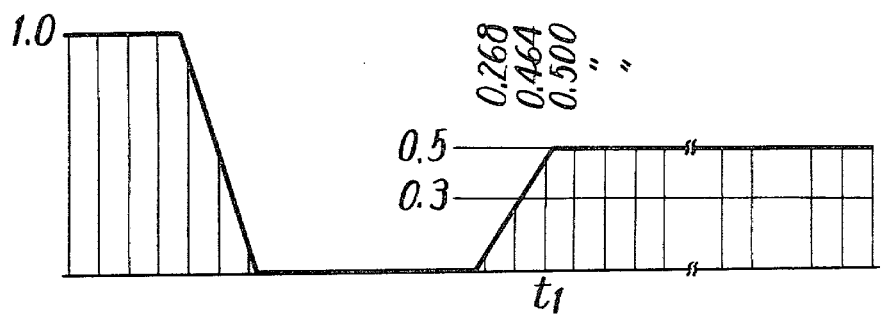
FIGS. 21A to 21E, and FIGS. 22A to 22F are views respectively used for explaining the embodiment of FIG. 20.
Figure 21B:
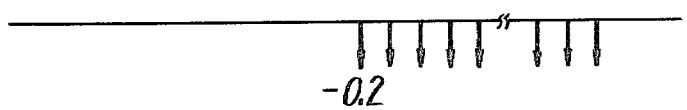
Figure 21C:
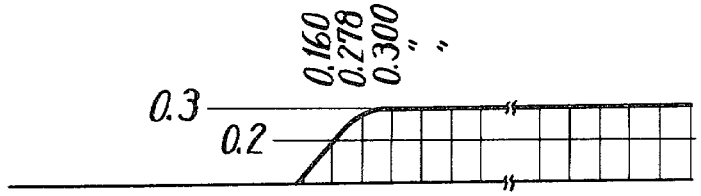

Accordingly, in this circuit the undesired signal is cancelled in the following manner. Let it be assumed that there is supplied a video signal including an undesired signal of in-phase component whose flat portion is, for example, 0.5 in level (where the level of reference signal is taken as 1.0) as shown in FIG. 21A. In this case, if the reference level Vth is established as, for example, 0.3, the comparator 28 produces a signal of +Δh at every sampling period after delay time $t_1$. Now, Δh is arranged to have a value corresponding to the gain of a level adjusting circuit I wherein an impulse of, for example, 0.01 is obtained therefrom. Thus, in this circuit of FIG. 20, when twenty operations of detection have been carried out, as shown in FIG. 21B impulses of 0.2 are respectively formed at respective sampling time points after the time point $t_1$, and the subtracter 6 has derived therefrom a video signal including an undesired signal whose level is 0.3 or less as shown in FIG. 21C.

Figure 21D:
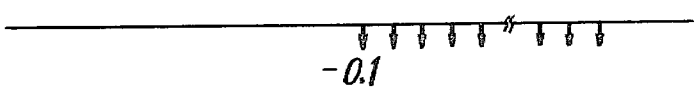
Figure 21E:
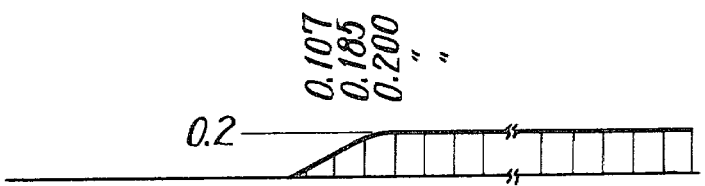

When the output signal of the comparator circuit 28 further keeps the condition of "0", the reference level control circuit 32 is operated to change-over the reference level Vth to, for example, 0.2. Then, the comparator circuit 28 again produces the signal of +Δh at every sampling period after the time point $t_1$. When this has been repeated ten times, as shown in FIG. 21D impulses of 0.1 are respectively formed and added to the former impulses of 0.2 so that impulses of 0.3 are formed. Thus, at the output side of the subtracter 6 is obtained a video signal including an undesired signal whose level is 0.2 or less as shown in FIG. 21E, this operation is repeated so that the level of undesired signal is further lowered.

Figure 22A:
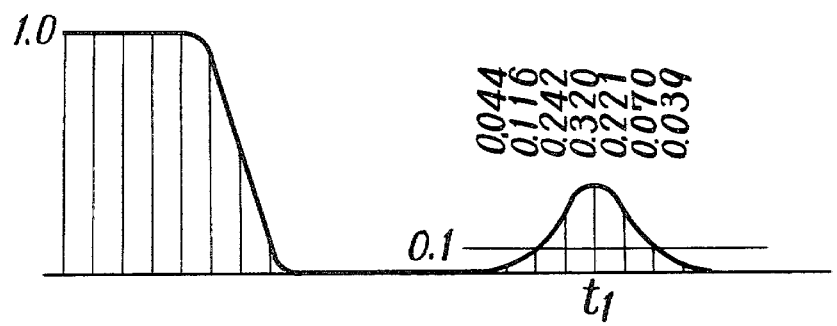
Figure 22B:
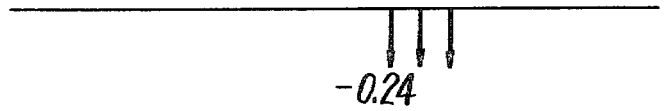
Figure 22C:
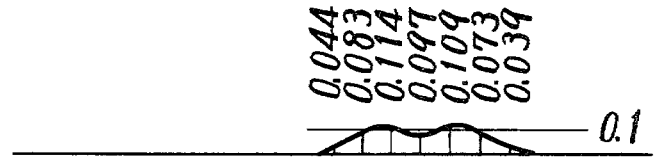
Figure 22D:
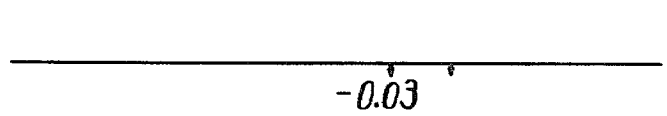
Figure 22E:
Figure 22F:
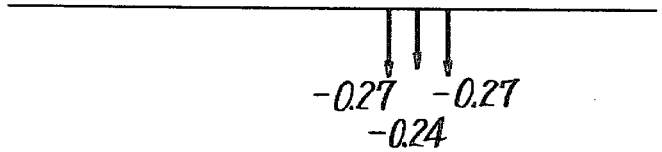

In the case that a video signal having an undesired signal of quadrature component as shown in FIG. 22A is supplied, impulses are formed similarly at a portion exceeding the reference level Vth, for example, 0.1. In this case, when Δh is taken as 0.01 and impulses are formed as shown in FIG. 22B at a time point where the detection is repeated 24 times, the level of the undesired signal becomes as shown in FIG. 22C. As apparent from the figure, the level at the center of the undesired signal becomes lower than 0.1. Accordingly, as a result of following detection, impulses are formed only at both sides of the center as shown in FIG. 22D. At a time point when the above detection is repeated three times, the level of undesired signal becomes as shown in FIG. 22E. At this time, the total added impulses become as shown in FIG. 22F.

Complicated multiple undesired signals are also cancelled in a similar manner. Further, in this circuit of FIG. 20, finally formed impulse train is similar in shape to the undesired signal. Therefore, it is considered that, as the initial value, the level of undesired signal is supplied as it is to the memory 31.

In the circuit of FIG. 20, upon turning-on the power supply or upon changing-over the channel, the switch 26 is changed over to a contact b during the interval of the first reference signal to supply the signal from the sampling circuit 24 to another register 33. A signal stored in each bit of the register 33 is supplied through each adder to the memory 31. With such an arrangement, a time during which necessary impulses are formed becomes short so that more rapid removal of undesired signal can be carried out.

FIG. 23 shows another example for automatic control in an undesired signal canceller. In this example, during the interval of first reference signal the initial value is supplied from the sampling circuit 24 through a contact b of a switch 34 to the register 33 and also during the interval of second reference signal a signal from the comparator 28 is supplied to the register 30. Then, the signals stored in the registers 33 and 30 are sequentially read out in a series manner and the read-out signals are added together at an adder 35. The added signal from the adder 35 is fed through a contact a of the switch 34 to the register 33. Accordingly, the register 33 is stored with the sum signal of the initial value and the second detected content, and the above process is repeated so that a control signal for a predetermined level adjusting circuit I is formed. The content of the register 33 is applied through a memory 36 to the level adjusting circuit I during one vertical interval.

Figure 26A:
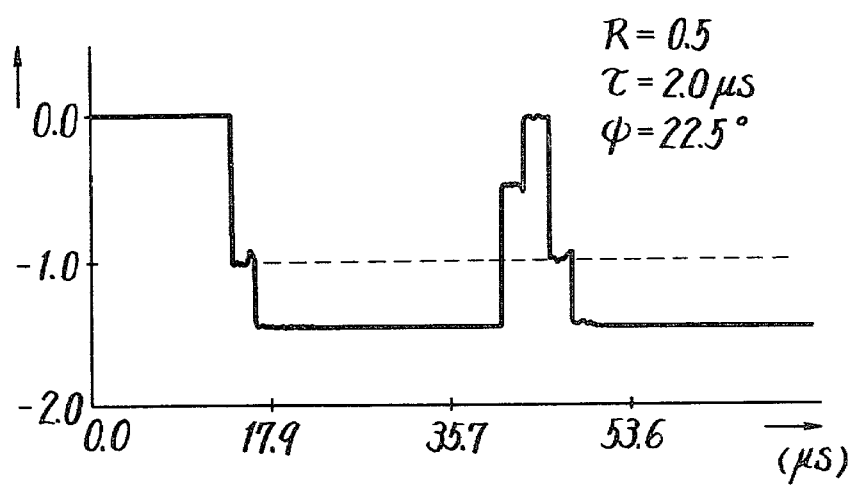
FIGS. 26A and 26B are views showing an effect of this invention.
Figure 26B:
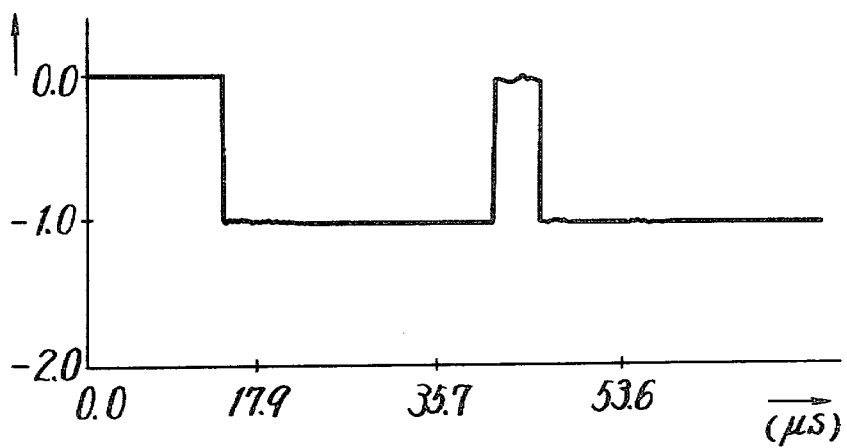

FIG. 24 shows an example where this invention is applied to a feed-forward type undesired signal canceller, and FIG. 25 shows an example where this invention is applied to a progressive summation type transversal filter. Further, FIGS. 26A and 26B show the results obtained by confirming the effect of this invention by the simulation of a computer, in which FIG. 26A shows a signal before the cancellation of undesired signal and FIG. 26B shows a signal obtained by cancelling the undesired signal from the signal of FIG. 26A. In FIG. 26A, R indicates amplitude ratio, $\tau$ delay time, and $\psi$ carrier phase angle.

While the principles of the invention have been described above in connection with specific embodiments, and particular modifications thereof, it is to be clearly understood that this description is made only by way of example and not as a limitation on the scope of the invention.

I claim as my invention:

1. Apparatus for cancelling an accompanying undesired signal from a desired signal comprising:
    (A) signal input means for receiving an input signal which includes desired and undesired signals;
    (B) programmable filter means connected to said signal input means and responsive to said desired signal for forming a waveform corresponding to said undesired signal;
    (C) a subtracting means connected between said signal input means and said programmable filter means for subtracting an output of said programmable filter means from said input signal;
    (D) control means connected to an output terminal of said subtracting means for detecting a level of said undesired signal to control said programmable filter means;
    (E) signal output means connected to the output terminal of said subtracting means; and
    (F) said programmable filter means including means for generating sequentially delayed replicas of corresponding differentiated components of said desired signal and means for superimposing said sequentially delayed replicas upon each other.

2. The apparatus of claim 1, wherein said programmable filter means includes a combination of a transversal filter and differentiation circuit.

3. The apparatus of claim 2, wherein said transversal filter has a plurality of cascade connected delay elements and a corresponding plurality of level adjusting circuits each connected to each of said delay elements; each of the outputs from said level adjusting circuits are combined with said differentiation circuit; and each of said level adjusting circuits is controlled by said control means.

4. The apparatus of claim 3, wherein said differentiation circuit is inserted between said transversal filter and said subtracting means; a first added means is inserted between said transversal filter and said differentiation circuit such that said first adder means adds the outputs from said plurality of level adjusting circuits and supplies the added output to said differentiation circuit; and a second adder means is provided for adding an output from the level adjusting circuit connected to the last delay element to an output of said differentiation circuit and supplying the added output to said subtracting means.

5. The apparatus of claim 4, wherein said differentiation circuit includes a connection between said first and second adder means and a combination of a delay element and an inverter connected between said first and second adder means in parallel with said connection.

6. The apparatus of claim 1, wherein said programmable filter means is connected between an output and one input of said subtracting means, and the signal input means is connected to the other input terminal of said subtracting means.

7. The apparatus of claim 1, wherein said programmable filter means is connected between said signal input means and one input terminal of said subtracting means, and said signal input means is connected to the other input terminal of said subtracting means.

8. An apparatus for cancelling an undesired signal accompanying a desired signal, comprising:
    (a) signal input means having a desired input signal along with an undesired signal;

(b) means connected between the signal input means and an output for eliminating the undesired signal;

(c) a programmable filter means connected to the output and responsive to said desired signal for forming a waveform corresponding to said undesired signal;

(d) control means connected to the output for detecting a level of said undesired signal to control said programmable filter means; and (e) said programmable filter means including delay elements and level adjustment stages controlled by the control means generating sequentially delayed replicas of corresponding differential components of said desired signal and the adjustment stages connecting to means for superimposing said sequentially delayed replicas upon each other, said means for superimposing having its output connected to the means for eliminating the undesired signal.

* * * * *